United States Patent [19]

Steiman

[11] 4,010,874
[45] Mar. 8, 1977

[54] PUMP FOR HAND-HELD DISPENSERS

[76] Inventor: Wolf Steiman, 649 Springer Road, Fairfield, Conn. 06430

[22] Filed: June 26, 1975

[21] Appl. No.: 590,688

[52] U.S. Cl. .............................................. 222/321
[51] Int. Cl.² ........................................ G01F 11/04
[58] Field of Search ........................... 222/321, 385

[56] References Cited
UNITED STATES PATENTS

| | | | |
|---|---|---|---|
| 3,257,961 | 6/1966 | Schlenker | 222/321 X |
| 3,500,761 | 3/1970 | Clevenger et al. | 222/321 X |
| 3,583,605 | 6/1971 | Corsette | 222/321 |
| 3,640,470 | 2/1972 | Susuki et al. | 222/385 X |
| 3,724,726 | 4/1973 | Susuki et al. | 222/385 |
| 3,796,375 | 3/1974 | Boris | 222/321 X |

*Primary Examiner*—Robert B. Reeves
*Assistant Examiner*—Francis J. Bartuska
*Attorney, Agent, or Firm*—H. Gibner Lehmann; K. Gibner Lehmann

[57] ABSTRACT

A pump construction for hand-held dispensers and the like, wherein a hollow plunger that is reciprocatively mounted at the top of a cylinder, slidably carries a hollow piston which is movable on the plunger between high and low positions thereon. The plunger has at its lower end a valve head which is engageable with an annular bearing seat at the lower end of the piston to seal off the passage through the piston when the latter is in its lower position on the plunger. When the piston is in its high position on the plunger, the valve head no longer seals the piston and the liquid product can flow past the valve head and through the piston and plunger, to be discharged from a spray head or orifice member at the top end of the plunger. For the high position of the piston on the plunger, cooperable valve portions of these parts become engaged to seal off the upper end of the piston so as to prevent leakage of liquid past the same. During depressing movement of the plunger and piston in the cylinder, a venting valve comprising cooperable portions of the piston and a bearing bushing becomes open, to allow influx of air into the container through a side opening in the wall of the cylinder.

1 Claim, 3 Drawing Figures

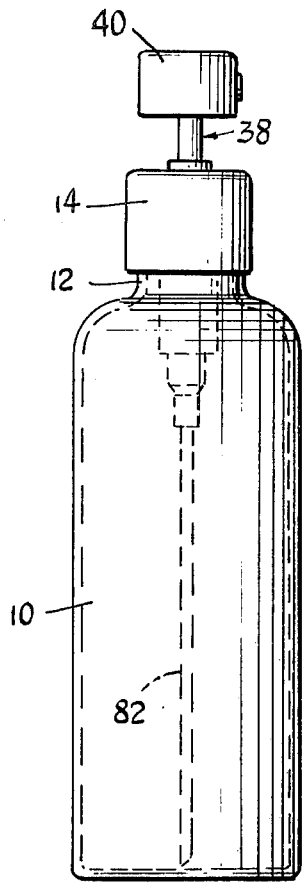
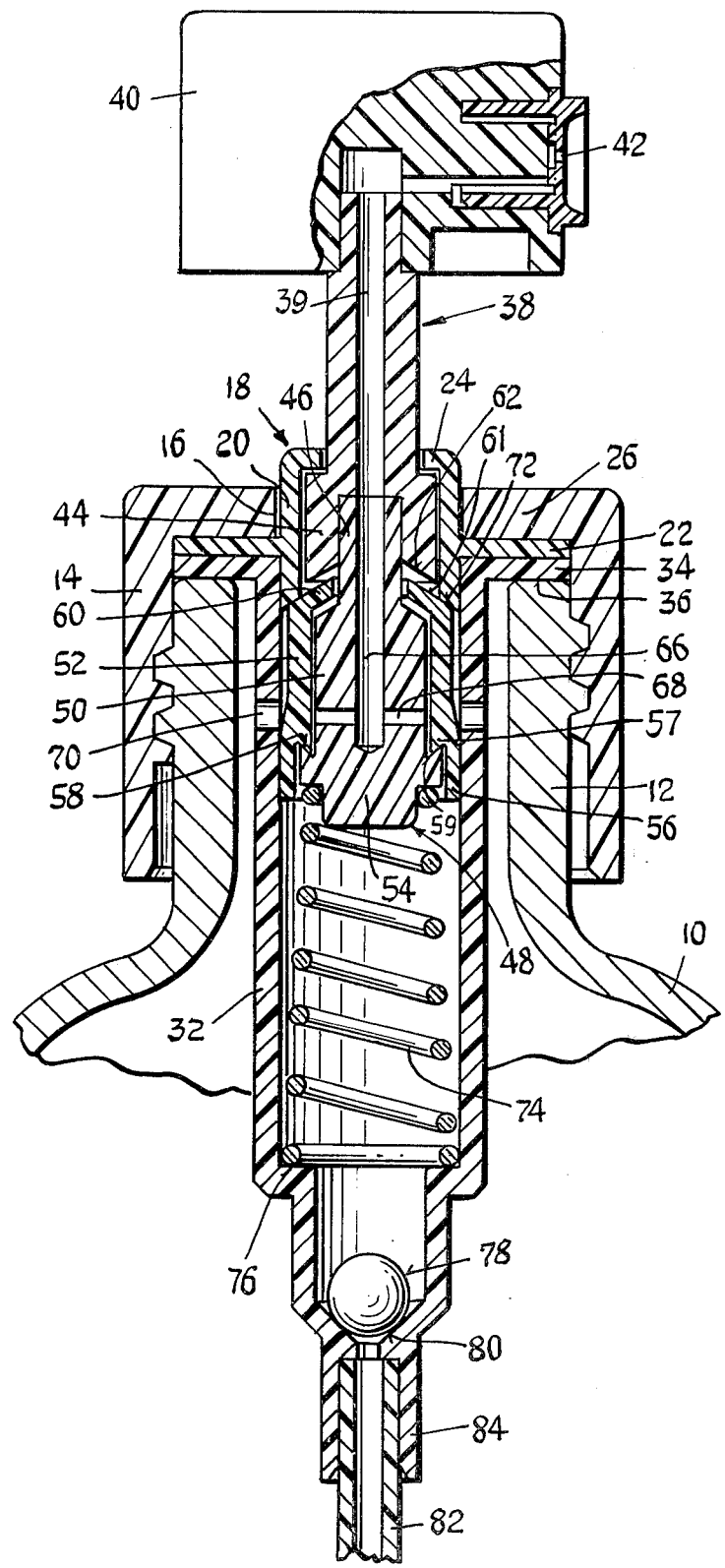

PUMP FOR HAND-HELD DISPENSERS

BACKGROUND

This invention relates to pump constructions for small hand-held dispensers and the like, and more particularly to pumps wherein a hollow plunger slidably carries at its lower end a hollow piston which is movable on the plunger between high and low positions at the time of the initial plunger movement. A pump construction of this type is illustrated and described in U.S. Pat. No. 3,257,961, issued to Schlenker and dated June 28, 1966. In this patented pump construction the hollow plunger has press-fitted into it the shank of a valve stem provided with an enlargement or head at its lower end, which is cooperable with an annular valve seat at the underside of the piston. Venting of the pump construction is accomplished by a special configuration of the plunger, piston and valve head which provides a somewhat devious path for the air entering the container to replace the liquid being dispensed therefrom. The parts involved in the venting co-act in such a manner that the free inflow of air into the container, to replace the discharged liquid, is not always insured. Moreover, the parts are so constructed and function in such a manner that critical dimensions and tolerances are required, resulting in an unnecessarily high fabrication and assembly cost.

Other prior pump constructions which have a more direct path for the influx of air, involve complicated bushing, cylinder and piston structures which can easily malfunction, causing undesired leakage of the container contents during shipping and storage, while still having the undesirable critical tolerances and high fabrication cost.

SUMMARY

The above drawbacks and disadvantages of prior pump constructions for hand-held containers are obviated by the present invention, which has for its main object the provision of a novel and improved slidable-piston type pump characterized by few and simple parts which can be economically molded of plastic substance, and also readily assembled. The relatively few parts are easily formed to the required dimensions and tolerances without undue expense, whereby an especially low fabricating cost is had. An additional object is to effect an improved, more reliable operation. The pump construction features a substantially direct passage to enable venting air to enter the container for replacing the liquid being discharged, and has especially effective valving means associated with the piston, whereby uniformly improved operation is had in addition to insurance against leakage.

The above objects are accomplished by the provision of a hollow plunger and piston which latter is slidably carried by the plunger and movable between high and low positions thereon, the piston having cooperable valving portions at its upper and lower ends which co-act with cooperable portions of the plunger to provide for valving action during the pumping movement. Also, the piston has an additional upper sealing surface which is cooperable with a valve seal or annular sealing shoulder of a bearing and mounting bushing in the cylinder, to shut off the vent passage and prevent leakage of liquid from the container when the pump is not in use.

In the illustrated embodiment of the invention, the upper portion or end of the piston comprises an inturned flange having a top surface which is conical and serves a dual valving function. The hollow plunger has a valve head at its lower end, formed as a separate piece and constituting an enlargement on a valve stem portion that is press-fitted into the bore of the plunger. The relative movement of the piston on the plunger renders operative annular valve means either at the lower end of the piston or else at its upper end, in cooperation with valving shoulders on the plunger.

Another feature of the invention resides in the provision of an improved pump construction as above characterized, wherein most of the parts are of plastic having simple configurations, enabling them to be readily economically molded in simple cavities.

Other features and advantages will hereinafter appear. In the accompanying drawings:

FIG. 1 is a side elevational view of a dispensing type container having the improved pump construction of the invention secured to its neck portion.

FIG. 2 is an axial sectional view of the pump construction and upper portion of the container, greatly enlarged, the parts being shown in the raised or storage, non-pumping position.

Figure 3:
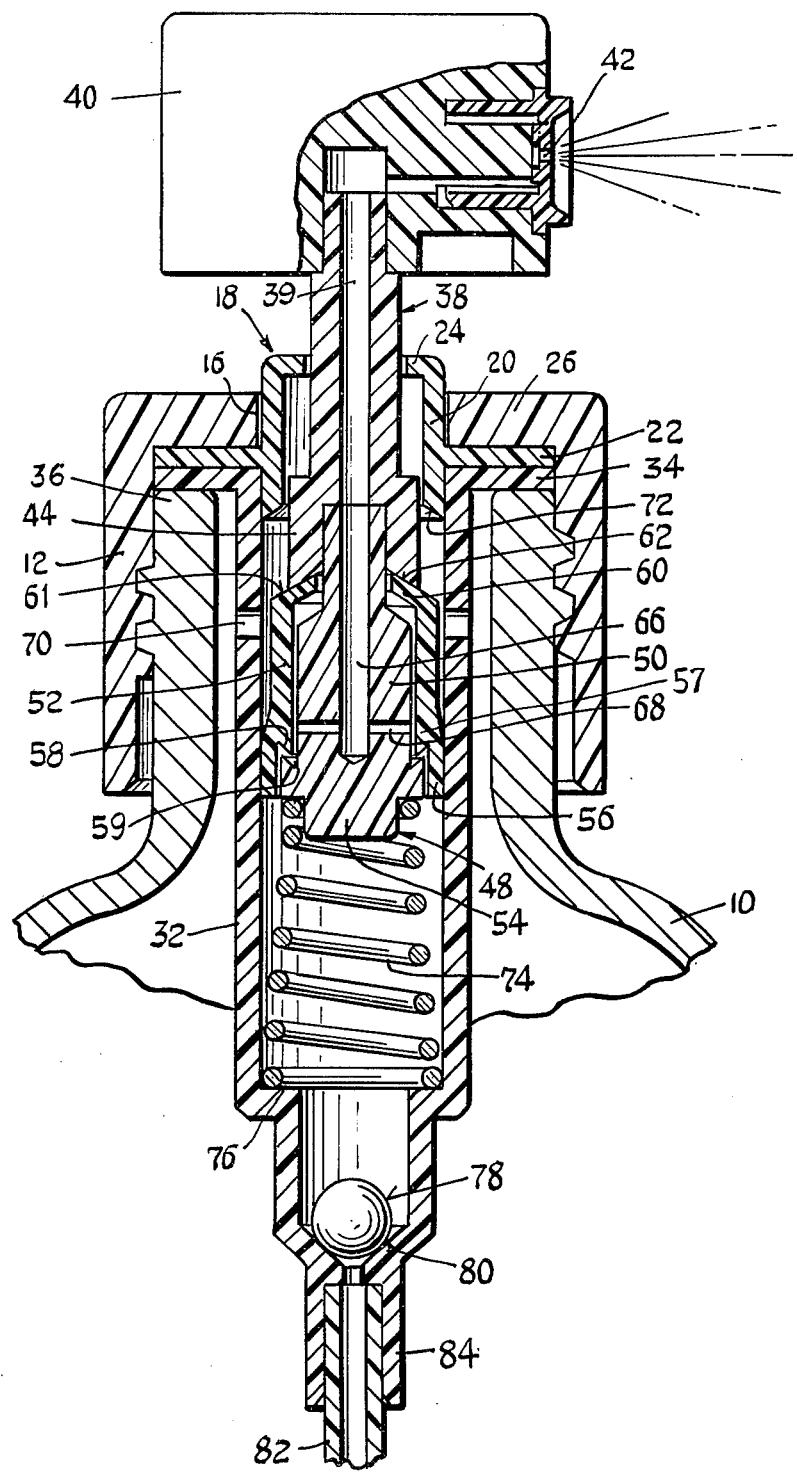
FIG. 3 is a view like that of FIG. 2, but showing the plunger and piston partially depressed, in positions occupied during the pumping operation wherein liquid is being discharged from the spray-head of the plunger.

Referring now to the drawings, the pump construction is shown as mounted on a container 10 having a reduced diameter neck 12 adapted to accommodate a screw cap 14 provided with a central opening 16.

In accordance with the present invention there is press-fitted in the screw cap a mounting and bearing bushing 18 having a tubular body portion 20, an annular exterior mounting flange 22, and an internal stop flange 24, the latter being located at the upper end of the bushing. The mounting flange 22 engages the underside of the top wall 26 of the cap, as shown. The screw cap 14 carries a cylinder 32 by means of an exterior annular mounting flange 34 which underlies the mounting flange 22 of the bushing 18 and is secured in place by engagement with the top edge or rim 36 of the container 10 as seen in FIGS. 2 and 3.

Reciprocatively carried in the bushing 18 is a hollow plunger 38 having a discharge passage 39, the upper end of the plunger being provided with a depress button 40 having an orifice 42 of usual construction. The shank of the plunger 38 has a portion 44 of enlarged diameter and bore, in which there is press-fitted the upper end 46 of a valve stem designated generally by the numeral 48. The valve stem 48 has an enlarged shank portion 50 providing a bearing surface on which there is slidably carried a hollow piston 52 for movement between high and low positions on the plunger 38. The high position of the piston 52 with respect to the plunger 38 is shown in FIG. 3, whereas the low position is shown in FIG. 2. Similarly, the raised and lowered positions of the piston 52 with respect to the cylinder 32 are shown in FIGS. 2 and 3 respectively.

The valve stem 48 has an enlargement or valve head 54 located within a resilient skirt 56 of the piston 52 and engageable with an annular lower valve seat 57 thereof to seal off the bore of the piston for the raised, non-discharging position of the pump as shown in FIG. 2. The lower valve seat 57 includes a circumferential, annular bead 58 which is received in a corresponding annular groove 59 in the valve head 54. The engaging surfaces are of conical configuration, providing a self-seating valve having good seal characteristics.

The lower plunger bore, specifically the valve stem bore, is designated by the numeral 66. Lateral passages 68 provide communication between the cylinder chamber adjacent the lower valve seat 57 and the plunger discharge passage 39 when the head 54 is disengaged from the seat as illustrted in FIG. 3.

At its upper end, the piston 52 has an inturned flange 60 which is engageable with a conical shoulder 62 constituting an annular valve seat of the plunger 38 to effect a valving action and seal off the bore of the piston 52 when the latter is in the high position on the plunger 38. For such position of the piston 52, the valve head 54 will be disengaged from the annular lower valve seat 57, thus enabling liquid to flow from the chamber of the cylinder 32 past the seat 57 and through the lateral passages 68 into the discharge passages 66 and 39 during the depressing movement of the piston and plunger. The loose sliding fit of the stem 50 in the piston 52 enables such liquid to be forced from the chamber of the cylinder 32 into the lateral passages 68, as will be understood.

To provide for venting of air into the container 10, for replacing the liquid being discharged therefrom, the cylinder 32 is provided with a side vent opening 70 in its upper position; the bushing 18 has an annular valve seat or sealing shoulder 72 of conical configuration which is cooperable with the upper edge or surface of the piston 52 at the inturned flange 60 thereof.

Preferably as shown, the flange 60 is of conical configuration, and has a valve face 61 which alternately seals against the annular valve seat 62 of the plunger (in FIG. 3) and against the shoulder 72 of the bushing 18 (FIG. 2). In the latter case, the flange 60 prevents leakage of fluid from the container vent opening 70 into the space between the portion 44 of the plunger and the bushing 18.

The pump construction is completed by a compression coil spring 74 engaging the underside of the valve head 54 and also an internal shoulder 76 in the cylinder 32, and by a check valve 78 which rests by gravity against a cooperable seat 80 in the lower end portion of the cylinder 32. A dip tube 82 is press-fitted into a nipple 84 at the bottom end of the cylinder 32, as shown.

Operation of the pump construction is as follows: Referring to FIG. 2, showing the non-pumping or storage position of the pump, the spring 74 maintains the valve head 54 in engagement with the lower valve seat 57 of the piston 52, and maintains the piston valve face 61 engaged with the sealing shoulder 72 of the bushing 18. Liquid in the cylinder 32 will be held captive, since it cannot escape past the valve head 54; nor can liquid from the location of the vent opening 70 pass the valve face 61 at the upper end of the piston 52. At the beginning of downward movement of the plunger 38, the valve head 54 will first be separated from the seat 57 of the piston, and the face 61 of the latter will then become engaged with the plunger valve seat 62. Continued downward movement of the plunger will now carry with it the piston 52 whereupon a pumping action will occur, forcing liquid from the cylinder 32 past the valve head 54 and into the lateral passages 68 of the valve stem 48, and thence to the passages 66 and 39 of the plunger for discharge from the spray orifice 42. Upon the upstroke of the plunger 38, liquid will be sucked into the cylinder through the dip tube 82 past the ball check valve 78; this will be accompanied by an inrush of air past the plunger 38 and sealing shoulder 72 of the bushing 18 and through the vent opening 70 of the cylinder into the container 10.

It will now be seen from the foregoing that I have provided a unique, especially simple and workable pump construction for small hand-held dispensers, wherein the parts are all of simple configuration and can be readily molded of plastic substance in simple mold cavities. The assemblage of the parts is easily and quickly effected. The bushing 18 can be press-fitted into the cap 14, and after assemblage of the valve stem 48, piston 52, and plunger 38, such assemblage can be inserted in the cylinder 32 and thereafter the parts applied to the assembled cap and bushing, as will be understood. After the container 10 has been filled, the cap and pump assemblage can be screwed onto the threaded neck 12, completing the operation.

I have found that the locating of the dual valving functions of the piston 52 at the top end thereof provides for effective seals and pumping action, in addition to simplifying the piston configuration.

Variations and modifications are possible without departing from the spirit of the invention.

I claim:

1. A pump construction for hand-held dispensers and the like, comprising in combination:
   a. a cylinder having a side vent opening in its upper portion,
   b. means providing an annular sealing shoulder on the cylinder inner wall at a location above said vent opening,
   c. a hollow plunger reciprocatively mounted at the top of the cylinder and movable in the direction of its axis in the upper portion of the cylinder, said plunger having a discharge passage, carrying a valve head at its lower portion, and having a slide bearing surface above the valve head,
   d. a hollow tubular piston carried by the plunger and movable in the cylinder between raised and lowered positions, said piston having a cylindrical body portion which is engageable with and slidable longitudinally on the bearing surface of the plunger between high and low positions thereon, and spaced from the walls of the cylinder, said piston having a lower skirt portion engageable with the cylinder walls and provided with a valve seat engageable with the valve head when the piston is in said low position on the plunger, and
   e. means providing a fluid passage from the lower valve seat of the piston to the discharge passage of the plunger when the valve seat is disengaged from the valve head,
   f. said plunger having an annular valve seat located above its slide bearing surface and engageable with an upper portion of the piston when the latter is in its high position on the plunger,
   g. the upper edge portion of the piston body portion constituting a valve which engages the sealing shoulder in the cylinder when the piston is in its raised position in the cylinder,
   h. the said upper portion of the piston having an inwardly-extending flange located at the upper piston end and extending toward the plunger axis, said plunger having a body portion disposed under said flange, and having means maintaining it spaced from the flange, i. the upper surface of said flange constituting a valve face adapted for engagement with the annular valve seat of the plunger,
j. said annular valve seat of the plunger being conical and snugly receiving the piston flange,
k. the upper surface of the piston flange and the said upper edge portion of the piston body portion constituting essentially a single continuous conical surface,
l. the annular sealing shoulder in the cylinder being conical for engagement with said single continuous conical surface of the piston body portion.

* * * * *